United States Patent [19]

Nakagawa et al.

[11] Patent Number: 5,767,174
[45] Date of Patent: Jun. 16, 1998

[54] VINYL CHLORIDE RESIN COMPOSITION

[75] Inventors: Hideki Nakagawa; Kyon Hun Min; Yuriko Kaida; Tomiya Sugiura; Shigeyuki Kozawa, all of Yokohama; Shigeharu Arai, Shiraoka-machi, all of Japan

[73] Assignees: Asahi Glass Company, Ltd.; Asahi Fiber Glass Company, Ltd., both of Tokyo, Japan

[21] Appl. No.: 776,191

[22] PCT Filed: May 23, 1996

[86] PCT No.: PCT/JP96/01370

§ 371 Date: Jan. 27, 1997

§ 102(e) Date: Jan. 27, 1994

[87] PCT Pub. No.: WO96/37553

PCT Pub. Date: Nov. 28, 1996

[30] Foreign Application Priority Data

May 25, 1995 [JP] Japan .................. 7-126541
Mar. 26, 1996 [JP] Japan .................. 8-070596

[51] Int. Cl.⁶ .................................................. C08K 9/04
[52] U.S. Cl. ........................ 523/217; 523/205; 523/206
[58] Field of Search ............................. 523/205, 206, 523/217

[56] References Cited

U.S. PATENT DOCUMENTS 5,047,263  9/1991  Glemet ............................. 427/203
5,258,232  11/1993  Summers et al. ............... 428/463

FOREIGN PATENT DOCUMENTS 1-101378  4/1989  Japan.

Primary Examiner—Melvyn I. Marquis
Assistant Examiner—D. Aylward
Attorney, Agent, or Firm—Oblon, Spivak, McClelland, Maier & Neustadt, P.C.

[57] ABSTRACT

A vinyl chloride resin composition comprising a vinyl chloride polymer and glass fibers coated with a resin obtained by melting a component comprising the following (a) to (c): (a) a polymer miscible with the vinyl chloride polymer, (b) a crystalline polymer immiscible with the vinyl chloride polymer, and (c) a peroxide; a vinyl chloride resin composition comprising a vinyl chloride polymer and glass fibers coated with a copolymer (e) resin having a polymer chain immiscible with the vinyl chloride polymer and a polymer chain miscible with the vinyl chloride polymer; a vinyl chloride resin composition comprising a vinyl chloride polymer, the copolymer (e) and glass fibers coated with a resin miscible with the vinyl chloride polymer.

19 Claims, No Drawings

VINYL CHLORIDE RESIN COMPOSITION

TECHNICAL FIELD

The present invention relates to a vinyl chloride resin composition which is excellent in moldability and which provides a molded product excellent in strength, impact strength, elastic modulus, moisture resistance and surface appearance.

BACKGROUND ART

A vinyl chloride resin and a vinyl chloride resin composition obtained by blending a plasticizer to a vinyl chloride resin have such merits that they are relatively excellent in mechanical strength, and they can be produced at a low cost. Accordingly, as resin materials for producing general purpose molded products, they are used for various purposes such as architectural parts, industrial parts and parts of electrical machinery and apparatus. However, they have such demerits that for some purposes, they are poor in heat resistance, mechanical strength, dimensional stability and thermal expansion.

To overcome these demerits, a study is being made to improve properties of a resin by alloying polymers having properties different from each other. For example, there are various proposals for alloying a vinyl chloride resin and an olefin resin (JP-B-60-36178, JP-A-63-604039, JP-A-1-165640, JP-A-2-199127, JP-A-2-199128, JP-A-2-199129 and the like). However, the polymer alloy thus obtained is poor in elastic modulus and heat resistance, since it contains an olefin resin.

On the other hand, it is known to incorporate glass fibers to a vinyl chloride resin to strengthen and improve the properties of the vinyl chloride resin. By this method, the rigidity and tensile strength can be fairly improved, but the impact strength is often lowered.

Particularly, since a vinyl chloride resin is poorer in melt flowability than other thermoplastic resins, the wettability with glass fibers is unsatisfactory, glass fibers are not dispersed evenly, and the melt flowability of the vinyl chloride resin wherein glass fibers are blended is extremely low. As a result, there were such demerits as breaking down of glass fibers during kneading, heat deterioration of the resin, and particularly a poor impact strength. Further, glass fibers come up to the surface of a molded material, and the surface therefore becomes coarse. Accordingly, surface appearance becomes inferior. Thus, satisfactory properties could not be easily obtained.

To overcome the above demerits, there are, for example, such proposals as (1) raising the molding temperature and (2) adding a lubricant, a surface modifying agent, or a resin miscible with a vinyl chloride resin having an excellent melt flowability, such as an ethylene-vinyl acetate copolymer, an ethylene-vinylchloride copolymer or chlorinated polyethylene, to lower the viscosity of a vinyl chloride resin, as a result, to improve the dispersibility and the wettability with glass fibers.

However, the above proposal (1) wherein the molding temperature is raised, is not practical, because a vinyl chloride resin originally has a molding temperature very close to the decomposition temperature, and it is therefore necessary to control the temperature strictly. Further, when adopting the above proposal (1), only a little rise of temperature makes the resin decomposed, and the mechanical strength of the molded material will be low.

The above proposal (2) wherein a resin is added so that the viscosity of a vinyl chloride resin is lowered, needs an addition of a large amount of resin to get a satisfactory level of viscosity, and it substantially changes the original characteristic of a vinyl chloride resin.

Therefore, the above proposal (2) has such demerits as the loss of such merit that the mechanical strength of a resin is improved by adding glass fibers.

Further, it is known that glass fibers are added from a vent hole or a die of an extruder to prevent the glass fibers from being broken down during molding and to improve the mechanical strength of a molded product. In accordance with this method, the glass fibers are not broken down, but the wetting between the resin and the glass fibers is not sufficient. Accordingly, this method has demerits such as the loss of the mechanical strength and particularly the remarkable loss of the moisture resistance.

To overcome these demerits, there are the following proposals (1) and (2). The proposal (1) disclosed in JP-B-49-6830, JP-B-49-13209 and JP-B-49-27663 is that such a vinyl monomer as vinyl chloride, vinyl acetate or an aromatic vinyl is polymerized in the presence of glass fibers, glass fibers are coated with the polymer made of such a monomer, and the glass fibers coated with the polymer are kneaded and mixed with a vinyl chloride resin to obtain a molded product. The proposal (2) disclosed in JP-A-6-65427 is that a compatibilizing agent is added to improve the properties of a polymer alloy.

In accordance with these methods, the adhesion property between a resin and glass fibers is improved, and the surface appearance and several kinds of mechanical strength of the molded product are improved a little, but these methods are not always satisfactory because the impact strength, the elastic modulus, the moisture resistance and the moldability are not balanced well. Since these methods include a batch polymerization reaction using a monomer, it takes much time for the production, a continuous production is impossible, and there is therefore an economical problem. Further, the length of the glass fibers to be used is restricted in practical production, and these methods are therefore disadvantageous.

The present invention overcomes the above-mentioned demerits of prior art, and it provides a polyvinyl chloride resin composition which is excellent in moldability, mechanical strength such as impact strength, and surface appearance.

DISCLOSURE OF THE INVENTION

The present inventors have studied and discovered that a vinyl chloride resin comprising glass fibers coated with a resin obtained by melting a component comprising a polymer miscible with a polyvinyl chloride, a crystalline polymer immiscible with a polyvinyl chloride, and a peroxide, is improved in such mechanical strength as impact strength, strength, elastic modulus and moisture resistance. Further, the present inventors surprisingly discovered that the moldability and the surface appearance are remarkably improved. This is the gist of the present invention, as described below.

A composition comprising 100 parts by weight of a vinyl chloride polymer (A) and 10 to 200 parts by weight of coated glass fibers (1) coated with a coating resin obtained by melting a component comprising a polymer (a) miscible with the vinyl chloride polymer, a crystalline polymer (b) immiscible with the vinyl chloride polymer, and a peroxide (c).

A composition comprising 100 parts by weight of a vinyl chloride polymer (A) and 10 to 200 parts by weight of coated glass fibers (2) coated with a coating resin of a copolymer (e) having a polymer chain (X) immiscible with the vinyl chloride polymer (A) and a polymer chain (Y) miscible with the vinyl chloride polymer in the same molecule.

A composition comprising 100 parts by weight of a vinyl chloride polymer (A), 1 to 15 parts by weight of the copolymer (e) having a polymer chain (X) immiscible with the vinyl chloride polymer and a polymer chain (Y) miscible with the vinyl chloride polymer in the same molecule, and 10 to 150 parts by weight of coated glass fibers (3) coated with a coating resin of a thermoplastic resin miscible with the vinyl chloride polymer.

The basic technical concept of the present invention resides in a composition comprising a vinyl chloride polymer, a polymer immiscible with the vinyl chloride polymer, a polymer miscible with the vinyl chloride polymer, and glass fibers.

The polymer immiscible with the vinyl chloride polymer and the polymer miscible with the vinyl chloride polymer are characterized in that they are used as a copolymer (1) obtained by melting and graft-polymerizing a component comprising the immiscible polymer and the miscible polymer, or as a copolymer (2) having a polymer chain of a monomer to form an immiscible homopolymer and a polymer chain of a monomer to form a miscible homopolymer in the same molecule.

That is, in order to make the polymers immiscible and miscible with the vinyl chloride polymer fulfill their functions effectively, a polymer having both of these characters in the same molecule is used.

Further, it is important that the glass fibers are basically coated with a thermoplastic resin miscible with the vinyl chloride polymer or with a resin having a polymer chain of a monomer to form a miscible homopolymer.

It is a feature that as the resin miscible with the vinyl chloride polymer, a thermoplastic resin miscible with the vinyl chloride polymer, the above copolymer (1), or the above copolymer (2) is used as the coating resin for glass fibers.

[With regard to the vinyl chloride polymer (A)]

The vinyl chloride polymer (A) used in the present invention is obtained by a well known method, i.e. a suspension polymerization method, an emulsion polymerization method, or a bulk polymerization method. The average degree of polymerization of the vinyl chloride polymer (A) is preferably 400 to 1,500, and is more preferably 450 to 1,000. If the average degree of polymerization is too small, it is observed that mechanical properties such as impact strength and elastic modulus and heat stability deteriorate, such being undesirable. If the average degree of polymerization is too large, the melt flowability deteriorates remarkably and molding will be too difficult.

Here, the vinyl chloride polymer polymer (A) is substantially a vinyl chloride polymer wherein at least 60% by weight of the constitutive components are polymer units based on vinyl chloride. Specifically, a vinyl chloride homopolymer, an ethylene-vinyl chloride copolymer, a vinyl acetate-vinyl chloride copolymer, a graft copolymer of an ethylene-vinyl acetate copolymer and a vinyl chloride polymer, and a chlorinated polyvinyl chloride may be mentioned. One or a combination of two or more selected from these polymers is used.

[With regard to the polymer (a) miscible with the vinyl chloride polymer (A)]

The term "miscible" is a state wherein the vinyl chloride polymer (A) and the miscible polymer are mixed with each other in molecular orders in a thermodynamically stable state, or is a character wherein a certain affinity acts to the interface and a stable micro phase separation state is obtained. Accordingly, when the polymer (a) is the vinyl chloride polymer (A), it is mixed substantially homogeneously. When the polymer (a) is miscible with the vinyl chloride polymer (A) to some extent, it can be dispersed stably in the continuous phase of the vinyl chloride polymer (A) in a particle state wherein the particle size is, for example, 0.01 to 10 μm.

That is, when the coated glass fibers containing the polymer (a) are blended and melt-kneaded with the vinyl chloride polymer (A), it can be rapidly dispersed homogeneously in the vinyl chloride polymer (A) together with the glass fibers, and it can improve the mechanical strength such as impact strength, strength, elastic modulus and moisture resistance remarkably due to the affinity of the interface with the matrix vinyl chloride polymer (A).

There is no particular restriction with regard to the molecular weight of the polymer (a). However, if the molecular weight is too large, it is not completely miscible with other components, such being undesirable. The average molecular weight is therefore preferably 1,000 to 400,000.

Hereinafter, the monomer to form a homopolymer immiscible with the vinyl chloride polymer (A) will be referred to as the monomer (m), and the monomer to form a homopolymer miscible with the vinyl chloride polymer (A) will be referred to as the monomer (n). The units derived from such a monomer and constituting a polymer will be referred to as polymer units. The polymer units derived from the monomer (m) will be referred to as the polymer units (m), and the polymer units derived from the monomer (n) will be referred to as the polymer units (n). Further, specific polymer units will be named by adding the term "polymer units" to the name of the monomer (for example, "propylene polymer units" or the like).

The polymer (a) contains the polymer units (n) miscible with the vinyl chloride polymer (A). However, as far as the polymer (a) is as a whole miscible with the vinyl chloride polymer (A), it may contain other polymer units. Such other polymer units may, for example, be polymer units other than the polymer units (n) and the polymer units (m), or polymer units which can be hardly identified with either one of these. The polymer (a) may contain two or more different kinds of the polymer units (n). The same applies when the polymer (a) contains the polymer units (m) or other polymer units.

The monomer (n) may, for example, be a vinyl chloride monomer, an acrylic acid type monomer such as an acrylic acid alkyl ester type monomer, a methacrylic acid type monomer such as a methacrylic acid alkyl ester type monomer or a vinyl cyanide type monomer.

The vinyl cyanide type monomer forms a polymer highly miscible particularly with the vinyl chloride polymer (A). However, since the homopolymer of the same is insufficient in the physical properties, it is preferably copolymerized with other monomers to form the polymer (a).

The polymer (a) may, for example, be the above-mentioned vinyl chloride polymer (A), a copolymer of a vinyl cyanide type monomer and an aromatic vinyl type monomer, an acrylic acid alkyl ester polymer, a methacrylic acid alkyl ester polymer, or a vinyl acetate polymer.

More specifically, the copolymer of a vinyl cyanide type monomer and an aromatic vinyl type monomer is a copolymer obtained by copolymerizing a vinyl cyanide type monomer such as acrylonitrile or methacrylonitrile, and an aromatic type vinyl monomer such as styrene, α-methyl styrene, vinyl toluene or chlorostyrene. The ratio of the polymer units based on the vinyl cyanide type monomer in the copolymer is preferably 5 to 80% by weight and is more preferably 10 to 50% by weight.

If the ratio of the vinyl cyanide polymer units is small, the miscibility with the vinyl chloride polymer (A) tends to be low, whereby it can not sufficiently be dispersed in the matrix vinyl chloride polymer (A), and the mechanical strength of the resulting molded product will be low, and the affinity with the glass fibers will be insufficient, whereby the moisture resistance of the resulting molded product will be poor, such being undesirable. As this copolymer, an acrylonitrile-styrene copolymer is particularly preferred.

The acrylic acid alkyl ester polymer or the methacrylic acid alkyl ester polymer is preferably a polymer of a monomer wherein the carbon number of the alkyl moiety is at most 4. If the carbon number of the alkyl moiety is 5 or larger, the miscibility of the polymer with the vinyl chloride polymer (A) tends to be low, such being undesirable for the same reasons as mentioned above. Particularly preferred is the methacrylic acid alkyl ester type monomer.

Preferred is one or more kinds of such methacrylic acid alkyl ester type monomer, a combination of this methacrylic acid alkyl ester type monomer and another methacrylic acid alkyl ester type monomer, or a combination of this methacrylic acid alkyl ester type monomer and a monomer other than the methacrylic acid alkyl ester type monomer.

Specifically, polymethyl acrylate, polymethyl methacrylate, polyethyl acrylate and polyethyl methacrylate may be mentioned. A particularly preferred polymer is polymethyl methacrylate.

The vinyl acetate polymer includes a vinyl acetate homopolymer and an ethylene-vinyl acetate copolymer. With regard to the ethylene-vinyl acetate copolymer, the ratio of the polymer units based on vinyl acetate monomer is preferably at least 10% by weight. If it is less than 10% by weight, the miscibility with the vinyl chloride polymer (A) tends to be low, such being undesirable for the same reasons as mentioned above.

As the polymer (a), it is more preferred to employ a polymer having a glass transition temperature higher than that of the vinyl chloride polymer (A) from the viewpoint of the heat resistance represented by the heat distortion temperature when it is blended with a vinyl chloride resin. An acrylonitrile-styrene copolymer or polymethyl methacrylate is particularly preferred.

[With regard to the crystalline polymer (b) immiscible with the vinyl chloride polymer (A)]

The polymer (b) does not have an affinity to the interface with the vinyl chloride (A), can not form a stable micro phase separation state, and has crystallinity. The crystallinity used here is a character to show a clear crystal melting point, for example, an endothermic peak in a thermal analysis such as DSC. That is, the crystallinity here is a character wherein the melt viscosity sharply decreases at said temperature, and does not necessarily mean a crystallinity of 100%.

The crystal melting point is preferably at most 250° C. which is close to the processing temperature of the vinyl chloride polymer (A), and is particularly preferably at most 200° C. Further, the lower limit is preferably at least 80° C., and is particularly preferably at least 100° C. because the glass transition temperature is preferably higher than that of the vinyl chloride polymer (A) in view of mechanical strength and heat resistance.

When the coated glass fibers are blended and melt-kneaded with the vinyl chloride polymer (A), the polymer (b) moiety in the coating resin is essentially immiscible with the vinyl chloride polymer (A), and it therefore slips on the molecular chain without being entangled with the molecular chain of the vinyl chloride polymer (A), that is, it exhibits the so-called slipping property. This is particularly remarkable when the crystal melting point does not exceed the processing temperature. Accordingly, the melt viscosity of the system can be lowered, the moldability and the surface appearance will be remarkably improved, and the shear stress resulting from kneading will be lowered. As a result, breakage of the glass will be less and particularly the impact strength can be improved.

There is no particular restriction with regard to the molecular weight of the polymer (b). However, if the molecular weight is too large, it can not sufficiently be kneaded with other components, such being undesirable. The average molecular weight is therefore preferably 1,000 to 400,000.

The polymer (b) contains the polymer units (m). However, as far as the polymer (b) is as a whole immiscible with the vinyl chloride polymer (A), it may contain the polymer units (n) or other polymer units. As far as the polymer units (m) are polymer units substantially immiscible with the vinyl chloride polymer (A), they are not restricted. For example, it is a homopolymer of ethylene, propylene or other α-olefin, or a combination of these monomers. Specifically, it is preferably polyethylene or polypropylene, and is particularly preferably polypropylene.

[With regard to the blending ratio of the polymer (a) and the polymer (b)]

With regard to the blending ratio of the polymer (a) and the polymer (b), to the total of both, the former is in the range of 95 to 5% by weight and the latter is in the range of 5 to 95% by weight. Particularly preferably, the former is in the range of 80 to 20% by weight and the latter is in the range of 20 to 80% by weight. If either one of these is less than 5% by weight, the above-mentioned effects of either the polymer (a) or the polymer (b) can not be achieved.

[With regard to the peroxide (c)]

The peroxide (c) can be decomposed by heat to produce free radicals, and known organic peroxides can be used. Specifically, the following examples may be given.

Ketone peroxides such as cyclohexanone peroxide and methylethylketone peroxide, hydroperoxides such as 1,1,3,3-tetramethylbutylhydroperoxide and t-hexylhydroperoxide, dialkylperoxides such as dicumylperoxide and 1,3-bis(t-butylperoxyisopropyl)benzene, diacylperoxides such as benzoylperoxide and lauroylperoxide, peroxydicarbonates such as diisopropylperoxydicarbonate and di-n-propylperoxydicarbonate, peroxyesters, peroxyketals, and the like.

With regard to the decomposition temperature, it is necessary that free radicals can be formed at a temperature under which a coating resin is obtained. The temperature of 10 hour-half period is preferably 70° to 150° C. in view of handling, although it depends on conditions.

The free radicals generated from peroxides during melting can be expected to provide the following functions:

(1) A molecular chain of the polymer (a) and/or the polymer (b) is cut, the melt viscosity of the system is lowered, and the impregnation property to the glass fibers is improved.

(2) At the same time, by a reaction for withdrawing hydrogen or the like from the polymer (a) and the polymer (b), new radicals will be formed at the molecular chain, Starting from the new radicals, a copolymer is considered to be produced by a reaction between the polymer (a) and the polymer (b). Said copolymer acts as a compatibilizing agent for the remaining polymer (a) and the polymer (b), and it makes mixing easy.

(3) When the below-mentioned monomer (d) coexists, a reaction starts from the new radicals formed at the monomer (d), the polymer (a) and/or the polymer (b), to form a copolymer which is able to firmly bond to the glass fibers.

These functions are particularly remarkable when the polymer (b) is polypropylene. When the coating resin obtained by melting the component comprising the polymer (a), the polymer (b) and the peroxide (c) is coated on the glass fibers, the melt viscosity of the coating resin in a melt state is preferably at most 1,000 poise to facilitate impregnation to the glass fibers. To the component comprising the polymer (a), the polymer (b) and the peroxide (c), various ingredients may be blended. For example, a surface treatment agent for glass fibers such as the below-mentioned silane coupling agent or a lubricant can be blended.

The amount of the peroxide to be added is determined depending on the melt viscosity of the coating resin in a melt state. If the amount to be added is too large, the reaction becomes complicated, and such is undesirable also from the viewpoint of operation, safety and economy. It is preferably within a range of 0.1 to 10 parts by weight, per 100 parts by weight of the total of the polymer (a) and the polymer (b).

[With regard to the monomer (d) to improve the adhesion to the glass fibers]

The monomer (d) can be used together with the polymer (a), the polymer (b) and the peroxide (c) to improve the adhesion between the glass fibers and the vinyl chloride polymer (A) and to improve the physical properties of the composition of the present invention. That is, by the action of the free radicals formed by the peroxide (c), the monomer (d) reacts with the polymer (a) and/or the polymer (b), to form a copolymer which is able to firmly bond to the glass fibers. The monomer (d) is preferably a vinyl monomer having a functional group. The functional group may, for example, be an epoxy group, a carboxyl group, a carboxylic anhydride group, an amino group, a silyl group having a hydrolyzable group, and an amide group or a hydroxyl group. Particularly preferred is an epoxy group, a carboxyl group or a carboxylic anhydride group.

The vinyl monomer having an epoxy group may, for example, be a glycidyl ester such as glycidyl acrylate, glycidyl methacrylate or glycidyl itaconate, or a glycidyl ether such as vinyl glycidyl ether or allyl glycidyl ether. Particularly preferred is glycidyl methacrylate or vinyl glycidyl ether. The vinyl monomer having a carboxyl group may, for example, be acrylic acid, methacrylic acid, itaconic acid or maleic acid. Particularly preferred is methacrylic acid or maleic acid. The vinyl monomer having a carboxylic anhydride group may be an unsaturated polybasic carboxylic anhydride which is an anhydride of a polybasic carboxylic acid having a polymerizable unsaturated group, such as maleic anhydride, itaconic anhydride or endic anhydride. Particularly, maleic acid anhydride is preferable.

If the amount of the monomer (d) is too large, the monomer (d) tends to initiate a secondary reaction against the polymer (a) and the polymer (b), such being undesirable, and a network structure is formed by a crosslinking reaction, whereby the resin becomes hardly meltable, and the dispersibility of the glass fibers will deteriorate remarkably. Accordingly, the suitable amount to be used is 0.1 to 20 parts by weight to 100 parts by weight of the total of the component comprising the polymer (a), the polymer (b) and the peroxide (c).

[With regard to the copolymer (e)]

The copolymer (e) can be used alone to coat the glass fibers. It can also be used together with the polymer (a), the polymer (b) and the peroxide (c). In this case, the above-mentioned monomer (d) can be also used together. Since the polymer chain (X) which is a constitutive component of the copolymer (e), is immiscible with the vinyl chloride polymer (A) like the polymer (b), and the polymer chain (Y) is miscible with the vinyl chloride polymer (A) like the polymer (a), it is substantially a structure having the above-mentioned polymer (a) and polymer (b) in one same molecular. Accordingly, the copolymer which is considered to be formed by the partial reaction between the polymer (a) and the polymer (b), is considered to be essentially the same structure as the copolymer (e).

However, the characters of the polymer (a) and the polymer (b) are completely opposite to each other against the vinyl chloride polymer (A), and these two polymers are essentially poor in miscibility to each other. If the difference in the melt viscosity between these two polymers is remarkably large when coating the glass fibers, it becomes more difficult to mix them homogeneously, the coated state of glass fibers will be non-uniform, and the reproducibility of the properties sometimes tends to be poor.

Accordingly, when such a phenomenon is evident from the combination of the selected polymers (a) and (b), the copolymer (e) may be used to obtain a coating resin, so that it serves as a compatibilizing agent for the polymer (a) and the polymer (b), and they can be homogeneously mixed very easily during the early period of melt-kneading.

In this case, it is more preferable that the polymer chain (X) has the same structure as the polymer (b), and the polymer chain (Y) has the same structure as the polymer (a), because such an action can be remarkably demonstrated. It is, therefore, not necessary to use it in a large amount, and 0.1 to 20 parts by weight to 100 parts by weight of the component comprising the polymer (a), the polymer (b) and the peroxide (c) is a suitable amount. When it is used alone to coat the glass fibers, 5 to 60 parts by weight to the coated glass fibers is a suitable amount.

The length of the polymer chain (X) in the copolymer (e) is not particularly restricted, so long as it is immiscible with the vinyl chloride polymer (A). Similarly, the length of the polymer chain (Y) is not particularly restricted, so long as it is miscible with the vinyl chloride polymer (A). However, a polymer wherein the polymer units to constitute an immiscible polymer and the polymer units to constitute a miscible polymer are polymerized alternately is not preferable for the copolymer (e), and a polymer wherein these polymer units are polymerized at random is not preferable for the copolymer (e), either.

Therefore, the copolymer (e) is preferably a block copolymer or a graft copolymer having one or more of the polymer chain (X) and the polymer chain (Y) respectively, and is more preferably a combination wherein the polymer chain (X) is structurally the same as the polymer (b) and the polymer chain (Y) is structurally the same as the polymer (a). In case of the graft copolymer, the polymer chain (X) may be either a straight chain or a branched chain. However, the graft copolymer wherein the polymer chain (X) is a straight chain and the polymer chain (Y) is a branched chain is preferred in view of the effect of the invention and the easiness of production.

With regard to the ratio of the polymer chain (X) and the polymer chain (Y) to constitute the copolymer (e), the former is in the range of 95 to 5% by weight and the latter is in the range of 5 to 95% by weight. It is particularly preferred that the former is in the range of 80 to 20% by weight, and the latter is in the range of 20 to 80% by weight.

The above range is preferred because it is effective as a compatibilizing agent for the polymer (a) and the polymer (b). There is no particular restriction with regard to the molecular weight of the copolymer (e). The average molecular weight is preferably 1,000 to 400,000, and is particularly preferably 2,000 to 200,000.

[With regard to specific examples of the polymer chain (X)]

The polymer chain (X) consists of a chain containing the polymer units (m). A relatively small amount of the monomer (n) or other monomers may be copolymerized with the monomer (m). However, the polymer chain (X) is preferably a polymer chain consisting essentially of one or more kinds of the monomer (m) only, and is more preferably a polymer chain having the same structure as the polymer (b).

Accordingly, the monomer (m) is preferably ethylene or propylene as described with regard to the polymer (b), and is particularly preferably propylene.

[With regard to specific examples of the polymer chain (Y)]

The polymer chain (Y) consists of a chain containing the polymer units (n), and the monomer (m) and other monomers may be copolymerized with the monomer (n). The polymer chain (Y) to be formed is more preferably selected from the monomer (n) and a combination of the monomer (n) and the monomer (m), to have substantially the same structure as the polymer (a). As described with regard to the polymer (b), the monomer (n) is therefore a vinyl chloride monomer, an acrylic acid type monomer such as an acrylic acid alkyl ester type monomer, a methacrylic acid type monomer such as a methacrylic acid alkyl ester type monomer, or a vinyl cyanide type monomer.

The monomer to form the polymer chain (Y) is particularly preferably a combination of acrylonitrile-styrene, or methyl methacrylate.

In the polymer chain (Y) comprising vinyl cyanide polymer units and aromatic vinyl polymer units, the ratio of the vinyl cyanide polymer units is, like in the polymer (a), preferably 5 to 80% by weight, and is particularly preferably 10 to 50% by weight, in the polymer chain (Y).

The method for producing the copolymer (e) is not particularly restricted, and a known method can be used. For example, a method may be mentioned wherein one or more kinds of the monomer (n) are reacted to a polymer obtained by polymerizing one or more kinds of the monomer (m), at a predetermined temperature, for example, 150° to 250° C. using a radical initiator such as benzoyl peroxide or dicumyl peroxide, to obtain a graft copolymer. In the polymerization reaction, a solvent such as toluene or xylene can be used if necessary.

Further, there is a method wherein after living-polymerizing one or more kinds of the monomer (m), one or more kinds of the monomer (n) are reacted thereto to obtain a block copolymer directly, or a method wherein a polymer obtained by polymerizing one or more kinds of the monomer (m) and a polymer obtained by polymerizing one or more kinds of the monomer (n), are polymerized separately, to introduce at one end of each polymer, a carboxyl group or an isocyanate group, and at the other end, a hydroxyl group or an amino group, and then, these modified polymers are reacted with each other to obtain the copolymer (e).

[With regard to the thermoplastic resin]

The thermoplastic resin to coat the glass fibers preferably consists of a polymer of a functional group-containing vinyl monomer with a monomer to form a polymer miscible with a vinyl chloride polymer. The functional group enhances the bonding between the glass fibers and a polymer such as the vinyl chloride polymer or the copolymer (e), and improves the physical properties of the composition of the present invention. The functional group may, for example, be an epoxy group, a carboxyl group, a carboxylic anhydride group, an amino group, a silyl group having a hydrolyzable group, an amide group or a hydroxyl group. Particularly preferred is an epoxy group, a carboxyl group, or a carboxylic anhydride group.

The thermoplastic resin is preferably a copolymer of a monomer having no functional group and a vinyl monomer having a functional group. However, it is not restricted to this, and it may be a thermoplastic resin obtained by introducing a functional group into a polymer having no functional group by a post-treatment. It is preferably the copolymer comprising 99.5 to 50% by weight of the monomer to form a polymer miscible with the vinyl chloride polymer and 0.5 to 50% by weight of the vinyl monomer having a functional group. If the latter ratio is less than 0.5% by weight, the impact strength will not be improved. If it exceeds 50% by weight, the miscibility with the vinyl chloride polymer tends to deteriorate, whereby the flowability or the dispersibility of glass fibers will be low, such being undesirable.

The monomer to form a polymer miscible with the vinyl chloride polymer to form the thermoplastic resin may be the above-mentioned monomer (n) or a combination of the monomer (n) and the monomer (m). However, it is not necessarily the same as the monomer (n) selected for the copolymer (e). In addition to the above illustrated monomers for the monomer (n), vinyl acetate, a combination of vinyl acetate-ethylene, and a combination of vinyl acetate-vinyl chloride are preferred.

The vinyl monomer having a functional group is generally a monomer to form a homopolymer miscible with a vinyl chloride polymer, but it is not restricted to this. The vinyl monomer having a functional group is preferably the above-mentioned monomer (d), and it is particularly preferably a vinyl monomer having a functional group selected from an epoxy group, a carboxyl group or carboxylic anhydride groups. Specifically, the above-mentioned monomers illustrated for the monomer (d) are preferred.

There is no particular restriction with regard to the molecular weight of the thermoplastic resin. However, if it is too large, the dispersibility of the glass fibers is poor when kneaded with the vinyl chloride polymer, such being undesirable. The average molecular weight is preferably 1,000 to 400,000.

[With regard to the coated glass fibers]

As the glass fibers, it is preferred to use relatively long glass fibers such as roving fibers or chopped strand fibers. Particularly preferred are commercially available roving glass fibers. The diameter of the glass fibers is preferably 1 to 20 μm.

Further, the glass fibers may be surface-treated as usual by a surface treating agent such as a coupling agent, a film former or a lubricant. The coupling agent is, for example, a silane coupling agent which is a silane compound wherein a hydrolyzable group is bonded to a silicon atom. Specific silane coupling agents are as follows A methacryl silane compound such as γ-methacryloxypropyltriethoxysilane or γ-methacryloxypropylmethyldiethoxysilane, an epoxy silane compound such as γ-glycidoxypropyltrimethoxysilane, an amino silane compound such as γ-aminopropyltriethoxysilane or N-β-aminoethyl-γ-aminpropyltriethoxysilane, a vinyl silane compound such as vinyltrimethoxysilane and a chlorosilane compound such as γ-chloropropyltrimethoxysilane.

The method for coating the coating resin to the glass fibers is not particularly restricted. A method may be used wherein the component comprising the polymer (a), the polymer (b) and the peroxide (c) is melt-mixed to form a coating resin in a melt state, and the coating resin in a melt state is coated on the glass fibers. The coating resin can be cooled once and be melted again to be used for coating.

It is preferred to employ a method wherein roving glass fibers are continuously passed through the resin vessel packed with the coating resin in a melt state, so that the coating resin is impregnated into and coated on the glass fibers, followed by cutting. In this case, it is preferred for continuous production to premix the component comprising the polymer (a), the polymer (b) and the peroxide (c) before heating, to melt-knead it at an adequate temperature using an extruder, and to introduce it into the coating resin vessel.

In this case, the amount to be extruded by the extruder depends on the amount of the glass fibers to be supplied in the coating resin vessel. The temperature of the coating resin vessel is preferably adjusted so that the melt viscosity of the coating resin in a melt state is at most 1,000 poise, particularly at most 500 poise. If the melt viscosity of the coating resin exceeds 1,000 poise, it becomes difficult for the coating resin to impregnate into the roving glass fibers, and when the coated glass fibers (1) or (2) are blended with the vinyl chloride polymer (A), dispersion of the glass fibers tends to be insufficient, whereby the mechanical strength will not be improved, and the surface appearance of the molded product will be substantially impaired, such being undesirable.

As the method for coating glass fibers with the thermoplastic resin, there is a method wherein the monomer of the resin is polymerized in the presence of the glass fibers, a method wherein the resin in a melt state is impregnated into the glass fibers, or a method wherein the solution or the emulsion of the resin is impregnated and then the solvent is removed therefrom. The method wherein the monomer is polymerized in the presence of the glass fibers is particularly preferred.

Specifically, when the chopped strand glass fibers are used, suspension polymerization is conducted in the presence of both the glass fibers and the monomer. On the other hand, when the roving glass fibers are used, it is preferred to employ a method wherein the glass fibers are continuously passed through the resin vessel in a melt state so that the resin is thereby impregnated into the glass fibers, and then cut.

The coated glass fibers obtained by the above-mentioned method have a length of preferably 1 to 50 mm in view of handling, more preferably 1 to 20 mm.

The blending amount of the coated glass fibers (1) or (2) in the composition is 10 to 200 parts by weight to 100 parts by weight of the vinyl chloride polymer (A). If it is less than 10 parts by weight, various properties of the vinyl chloride resin will not sufficiently be strengthened or improved. If it exceeds 200 parts by weight, the efficiency of adding the glass fibers will not be improved so much and inversely the moldability will extremely deteriorate.

The blending amount of the coated glass fibers (3) in the composition is 10 to 150 parts by weight to 100 parts by weight of the vinyl chloride polymer (A). If it is less than 10 parts by weight, various properties of the vinyl chloride resin will not sufficiently be strengthened or improved. If it exceeds 150 parts by weight, the efficiency of adding the glass fibers will not be improved so much.

The amount of the coating resin in the coated glass fibers is preferably at least 5% by weight in the coated glass fibers. If the amount of the coating resin is less than 5% by weight, the glass fibers will not be completely coated, and when it is kneaded with the vinyl chloride polymer, the dispersibility of the glass fibers or the adhesion property to the vinyl chloride polymer tends to be insufficient. If the amount of the coating resin is too large, the ratio of the coating resin to all the polymer components becomes high, and such is not advantageous economically and in view of deterioration of the physical properties. The amount of the coating resin is preferably at most 60% by weight, particularly preferably at most 40% by weight.

The amount of the glass fibers in the composition of the present invention is preferably 5 to 100 parts by weight to 100 parts by weight of the vinyl chloride polymer (A). If it is less than 5 parts by weight, various properties of the vinyl chloride resin will not sufficiently be strengthened or improved. If it exceeds 100 parts by weight, the efficiency of adding the glass fibers will not be improved so much, and inversely the moldability will extremely deteriorate. The amount of the coating resin coated with the glass fibers in the composition is preferably at most 100 parts by weight, particularly preferably at most 60 parts by weight, to 100 parts by weight of the vinyl chloride polymer.

The composition of the present invention is preferably used as a molding composition which will be subjected to molding. That is, the composition will be subjected to molding by itself or by further adding various additives. The molding method of the vinyl chloride resin composition may, for example, be injection molding, extrusion molding, press molding, or calender molding, which is applicable generally to a thermoplastic resin and the like.

Specifically, powder or pellets of the composition is blended using a Henshel mixer or the like, and it is melt-kneaded at 150° to 180° C. by a single screw extruder or a twin screw extruder to obtain a molded product. Particularly, it is preferably used for producing a molded product by extrusion molding.

Together with the composition of the present invention, known additives such as a stabilizer for a vinyl chloride resin, an agent for improving impact strength, a lubricant, a pigment, an antistatic agent, an age resistor, a filler, a blowing agent, and a fire retardant can be used, if necessary. The typical examples of these additives are as follows.

The stabilizer including such an organic tin heat stabilizer such as dibutyl tin mercaptide, dibutyl tin dilaurate or dibutyl tin distearate, a stabilizer of a fatty carboxylate such as barium stearate, calcium stearate or zinc stearate, an inorganic stabilizer, an epoxy compound such as epoxidized soybean oil, an organic phosphate and an organic phosphite, the agent for improving impact strength including MBS resin and acrylic rubber, the lubricant including wax, a metallic soap and a higher fatty acid such as stearic acid, the age resistor including a phenol antioxidant, a phosphite stabilizer and a ultraviolet ray absorbent, and the filler including carbon black, hydrated calcium silicate, silica, calcium carbonate and talc.

The total amount of these additives is, except for the filler, preferably at most 50 parts by weight to 100 parts by weight of the vinyl chloride polymer (A). Even if including the filler, the total amount of these additives is preferably at most 100 parts by weight to 100 parts by weight of the vinyl chloride polymer.

The shape of the molded product of the composition of the present invention is not particularly restricted. However, it is preferably an extruded molded product such as a plate-like, bar-like or tube-like product having various shapes of cross sections. Typically, these are used as such architectural materials as a gutter, eaves, an external wall siding material and a window frame, because these have such properties as strength, impact strength and elastic modulus, and the expansion and contraction are extremely small due to the low coefficient of linear expansion.

In the present invention, the vinyl chloride polymer is blended with the coated glass fibers coated with the coating resin obtained by melting the component comprising the polymer (a) miscible with the vinyl chloride polymer, the crystalline polymer (b) immiscible with the vinyl chloride polymer and the peroxide (c). Thereby, the melt property of the vinyl chloride resin is remarkably improved due to the slipping action by the polymer (b), and the synergistic effect of the dispersibility improved by the polymer (a) in the matrix resin vinyl chloride polymer and the strengthened interface adhesion to the glass fibers is obtained. Accordingly, the present invention provides the vinyl chloride resin composition wherein the strength, the impact strength, the elastic modulus, the moisture resistance, the surface appearance and the moldability are remarkably improved, which could not be achieved by the prior art.

If coating is conducted with the coating resin of the copolymer (e) having the polymer chain (X) immiscible with the vinyl chloride polymer and the polymer chain (Y) miscible with the vinyl chloride polymer in the same molecule, the glass fibers can be coated effectively and uniformly.

Further, by using the vinyl chloride polymer, the copolymer (e) and the glass fibers coated with the thermoplastic resin having a functional group essentially miscible, the composition having the above-mentioned excellent property can be obtained. The composition of the present invention is extremely useful for e.g. an extrusion molding composition.

BEST MODE FOR CARRYING OUT THE INVENTION

The present invention will be described in further detail with reference to the Examples 1 to 10 and Comparative Examples 11 to 17, but it should be understood that the present invention is by no means restricted to these.

[Preparation of the vinyl chloride polymer (A)]

3 parts by weight (hereinafter referred to simply as parts) of partially saponificated polyvinyl alcohol (Gosenol KH-20 made by Nihon Gosei Kagaku), 0.5 part of azobisisobutylonitrile and 3,000 parts of pure water were added to a pressure reaction type reactor, a nitrogen-replacement was conducted, and then 1,000 parts of vinyl chloride monomer were added thereto. After conducting a reaction at 65° C. for 6 hours, the remaining monomer is removed, followed by dehydration-drying to obtain 950 parts of a polymer in a powder form. The degree of polymerization of the polymer thus obtained was 800. Hereinafter, this will be referred to as the polymer A.

[Preparation of the coated glass fibers]

The components to be used for the coated glass fibers are as follows.

(a1) Acrylonitrile-styrene copolymer (containing 28% by weight of acrylonitrile, melt index (hereinafter referred to as MI): 25 g/10 min.), (b1) polypropylene (crystal melting point: 165° C., MI: 13 g/10 min.), (c1) dicumyl peroxide (10 hour-half time temperature: 117° C.), (d1) maleic anhydride, and (e1) copolymer.

[Preparation for the copolymer (e)]

60 parts of polypropylene, 0.1 part of Iruganox 1010 (antioxidant made by Chiba-Geigy), 1 part of dicumyl peroxide, 10 parts of acrylonitrile and 30 parts of styrene were polymerized in the nitrogen atmosphere at 170° C. for 2 hours. After the polymerization, it was sufficiently washed with acetone and was dried to obtain a copolymer.

The copolymer thus obtained was a graft copolymer comprising a chain consisting of propylene polymer units and a copolymer chain consisting of acrylonitrile polymer units-styrene polymer units. The chain consisting of propylene polymer units was 70% by weight, and the copolymer chain consisting of acrylonitrile polymer units-styrene polymer units, wherein the weight ratio of the acrylonitrile polymer units/the styrene polymer units was 28/72 (AN/St= 28/72), was 30% by weight. Hereinafter, this is referred to as the copolymer (e1).

A graft copolymer was obtained in the same manner as the copolymer (e1) except that the starting ratio and the starting amounts of acrylonitrile and styrene were changed. The graft copolymer thus obtained comprises 50% by weight of the chain consisting of propylene polymer units and 50% by weight of the copolymer chain consisting of acrylonitrile polymer units-styrene polymer units, wherein the weight ratio of the acrylonitrile polymer units/the styrene polymer units was 25/75 (AN/St=25/75). Hereinafter, this is referred to as the copolymer (e2).

A graft copolymer was obtained in the same manner as the copolymer (e1) except that 40 parts of methyl methacrylate were used in place of acrylonitrile and styrene. The graft copolymer thus obtained comprises 70% by weight of the chain consisting of propylene polymer units and 30% by weight of the chain consisting of methyl methacrylate polymer units. Hereinafter, this is referred to as the copolymer (e3).

(1) 40 parts of the above (a1), 60 parts of the above (b1) and 2.5 parts of the above (c1) were blended using Henshel mixer. Thereafter, it was extruded using a 50 mm single screw extruder at a cylinder temperature of 250° C. at a die temperature of 300° C. at a rotational speed of 75 rpm, and it was supplied into the coating resin vessel maintained at 300° C. The melt viscosity of the coating resin comprising the component (a1), (b1) and (c1) was measured using a capillary having the length of 2.5 mm and the diameter of 0.25 mm at 300° C. at the shear rate of 1,000 sec$^{-1}$, and it was 95 poise. On the other hand, roving glass fibers having the fiber diameter of 13 μm were continuously passed through the melted coating resin vessel, and the coating resin was impregnated between the monofilaments. Thereafter, they were passed through the die having a diameter of 2.2 mm so that the excess of the resin was removed, and the weight ratio of the resin component/the glass fibers was adjusted to 30/70. The coated glass fibers thus obtained were cut by a rotary cutter to 6 mm. Hereinafter, this is referred to as the coated glass fibers (B-1).

(2) In the same manner as for (B-1), the coating resin comprising the component (a1), (b1), (c1), (d1) and (e1) in the ratio as shown in Table 1, was impregnated into the glass fibers roving, followed by cutting to obtain the coated glass fibers (B-2) to (B-5) having a length of 6 mm and having a weight ratio of the resin component/the glass fibers of 30/70.

The melt viscosities (poise) of these coating resins are shown in Table 1.

(3) In the same manner as for (B-1), the coating resin of (e1) was impregnated into the glass fibers roving, followed by cutting to obtain the coated glass fibers (B-6) having a length of 6 mm and having a weight ratio of the glass fibers to the resin component of 30/70.

For comparison, without using all of the components (a1), (b1) and (c1), in the same manner as for (B-1), the coated glass fibers (C-1) to (C-3) were obtained. The melt viscosities (poise) of these coating resins are shown in Table 1.

[Preparation for the thermoplastic resin coated glass fibers]

(1) 280 parts of chopped strand glass fibers having a length of 3 mm and a fiber diameter of 13 μm were sufficiently impregnated into the mixed solution comprising 40 parts of acrylonitrile, 60 parts of styrene, 6 parts of glycidyl methacrylate and 1 part of benzoyl peroxide. Thereafter, 1,800 parts of water were added thereto, and polymerization was carried out at 80° .C for 5 hours. After the polymerization, it was washed with water well and was dried at 60° C. The amount of the glass fibers in the thermoplastic resin coated glass fibers thus obtained was 80% by weight, and the weight ratio between the acrylonitrile polymer units, the styrene polymer units and the glycidyl methacrylate polymer units was 27/68/5. Hereinafter, this is referred to as the coated glass fibers (D-1).

(2) Thermoplastic resin coated glass fibers were obtained in the same manner as for (D-1) except that 12 parts of maleic anhydride was used in place of glycidyl methacrylate. The amount of the glass fibers in the thermoplastic resin coated glass fibers thus obtained, was 80% by weight, and the weight ratio between the acrylonitrile polymer units, the styrene polymer units and the maleic anhydride polymer units was 26/66/8. Hereinafter, this is referred to as the coated glass fibers (D-2).

(3) For comparison, thermoplastic resin coated glass fibers having no functional group were obtained in the same manner as for (D-1) without using glycidyl methacrylate. The amount of the glass fibers in the thermoplastic resin coated glass fibers thus obtained was 80% by weight, and the weight ratio of the acrylonitrile polymer units/the styrene polymer units was 28/72 (AN/St=28/72). Hereinafter, this is referred to as the thermoplastic resin coated glass fibers (E).

EXAMPLE 1

The polymer A and the coated glass fibers (B-1) in the amounts shown in Table 2 (unit: parts), 3 parts of dibutyl tin mercaptide and 0.5 part of stearic acid were blended using a Henshel mixer. Thereafter, using a 30 mm single screw extruder of L/D=24 and a compression ratio=2.3, a flat plate having a thickness of 3 mm and a width of 30 mm, was extrusion-molded at a cylinder temperature of 165° C. at a die temperature of 185° C. at a rotational speed of 20 rpm. The extrusion-molding property, the glass fiber dispersibility, the surface appearance and various material properties of the flat plate thus obtained were evaluated by the following method. The results are shown in Table 3.

Extrusion-molding property: evaluated by the screw load (unit; ampere) and the extruded amount (unit: g/min.).

glass fiber dispersibility: three-rank evaluation by visual observation (○: no glass fiber bundle, Δ: a small amount of glass fiber bundles, X: a large amount of glass fiber bundles).

surface appearance: three-rank evaluation by visual observation (○: evenly glossy on the surface, and no rough area or external waviness observed, Δ: unevenly glossy on the surface, or rough area and external waviness observed, X: unevenly glossy on the surface, and rough area and external waviness observed), tensile strength (unit: $10^2$ kg/cm$^2$) and tensile elastic modulus (unit: $10^2$ kg/cm$^2$): based on JIS K7113, flexural strength (unit: $10^2$ kgf/cm$^2$) and flexural elastic modulus (unit: $10^2$ kgf/cm$^2$): based on JIS K7203, Izod impact strength (with notch) (unit: kg.cm/cm$^2$): based on JIS K7110, heat distortion temperature (unit: ° C.): based on JIS K7207 (load 18.5 kg/cm$^2$), and moisture resistance (unit: %): evaluated by the tensile strength retention after a flat molded material was dipped in warm water of 50° C. for 7 days.

EXAMPLES 2 TO 6

The polymer A and the coated glass fibers (B-2) to (B-6) in the amounts shown in Table 2 (unit: part), 3 parts of dibutyl tin mercaptide and 0.5 part of stearic acid were blended. In the same manner as Example 1, a flat molded material was produced and was evaluated in various ways. The results are shown in Table 3

EXAMPLE 7

The amounts in the amounts shown in Table 2 (unit: part) of the polymer A, the copolymer (e1) and the coated glass fibers (D-1), 3 parts of dibutyl tin mercaptide and 0.5 part of stearic acid were blended using a Henshel mixer. Thereafter, using a 30 mm single screw extruder of L/D=24 and a compression ratio=3.1, a flat plate having a thickness of 3 mm and a width of 30 mm was extrusion-molded at a cylinder temperature of 180° C. at a die temperature of 165° C. at a rotational speed of 7.8 rpm. The extrusion-molding property, the surface appearance and various material properties of the flat plate thus obtained were evaluated and measured by the following method. The results are shown in Table 4.

EXAMPLES 8 TO 10

The polymer A, the copolymers (e1) to (e3) and the thermoplastic resin coated glass fibers (D-1) and (D-2) in the amounts shown in Table 2 (unit: part), 3 parts of dibutyl tin mercaptide and 0.5 part of stearic acid were blended. In the same manner as Example 7, a flat molded material was produced and was evaluated in various ways. The results are shown in Table 4.

EXAMPLES 11 TO 13

The polymer A and the coated glass fibers (C-1) to (C-3) in the amounts shown in Table 2 (unit: part), 3 parts of dibutyl tin mercaptide and 0.5 part of stearic acid were blended. In the same manner as Example 1, a flat molded material was produced and was evaluated in various ways. The results are shown in Table 3.

EXAMPLE 14

The polymer A and the chopped strand glass fibers FE not coated with a coating resin obtained by cutting the robing glass fibers to be used for the coated glass fiber to 6 mm in the amounts shown in Table 2 (unit: part), 3 parts of dibutyl tin mercaptide and 0.5 part of stearic acid were blended. In the same manner as Example 1, a flat plate molded material was produced and was evaluated in various ways. The results are shown in Table 3.

EXAMPLES 15 AND 16

The polymer A, the copolymer (e1) and the thermoplastic resin coated glass fibers (D-1 to (E) in the amounts shown in Table 2 (unit: part), 3 parts of dibutyl tin mercaptide and 0.5 part of stearic acid were blended. In the same manner as Example 7, a flat plate molded material was produced and was evaluated in various ways. The results are shown in Table 4.

EXAMPLE 17

The polymer A and the chopped strand glass fibers G having a length of 3 mm and a fiber diameter of 13 μm in the amounts shown in Table 2 (unit: part), 3 parts of dibutyl tin mercaptide and 0.5 part of stearic acid were blended. In the same manner as Example 7, a flat plate molded material was produced and was evaluated in various ways. The results are shown in Table 4.

Referring to Table 3 and 4, the tensile strength, the tensile elastic modulus, the flexural strength, the flexural elastic modulus and the moisture resistance are more excellent than those of Comparative Examples. Particularly, the impact strength is remarkably improved and an extremely excellent mechanical property is shown. The moldability and the surface appearance are also excellent.

TABLE 1

| Coated glass fibers | (a1) | (b1) | (c1) | (d1) | (e1) | Melt viscosity |
|---|---|---|---|---|---|---|
| B-1 | 40 | 60 | 2.5 | 0 | 0 | 95 |
| B-2 | 20 | 80 | 2.5 | 0 | 0 | 52 |
| B-3 | 40 | 60 | 2.5 | 5 | 0 | 120 |

TABLE 1-continued

| Coated glass fibers | (a1) | (b1) | (c1) | (d1) | (e1) | Melt viscosity |
|---|---|---|---|---|---|---|
| B-4 | 80 | 20 | 2.5 | 0 | 10 | 550 |
| B-5 | 20 | 80 | 2.5 | 5 | 10 | 75 |
| B-6 | 0 | 0 | 0 | 0 | 100 | 750 |
| C-1 | 100 | 0 | 2.5 | 5 | 0 | 2120 |
| C-2 | 0 | 100 | 2.5 | 5 | 0 | 35 |
| C-3 | 40 | 60 | 0 | 5 | 10 | 920 |

TABLE 2

| Examples | Polymer (A) | (e) | Coated glass fibers (B) | (C) | (D) | (E) | Uncoated glass fibers (F) | (G) |
|---|---|---|---|---|---|---|---|---|
| 1 | 100 | 0 | 30(B-1) | 0 | 0 | 0 | 0 | 0 |
| 2 | 100 | 0 | 30(B-2) | 0 | 0 | 0 | 0 | 0 |
| 3 | 100 | 0 | 30(B-3) | 0 | 0 | 0 | 0 | 0 |
| 4 | 100 | 0 | 30(B-4) | 0 | 0 | 0 | 0 | 0 |
| 5 | 100 | 0 | 30(B-5) | 0 | 0 | 0 | 0 | 0 |
| 6 | 100 | 0 | 30(B-6) | 0 | 0 | 0 | 0 | 0 |
| 7 | 100 | 5(e-1) | 0 | 0 | 35(D-1) | 0 | 0 | 0 |
| 8 | 100 | 5(e-1) | 0 | 0 | 35(D-2) | 0 | 0 | 0 |
| 9 | 100 | 5(e-2) | 0 | 0 | 35(D-1) | 0 | 0 | 0 |
| 10 | 100 | 5(e-3) | 0 | 0 | 35(D-1) | 0 | 0 | 0 |
| 11 | 100 | 0 | 0 | 30(C-1) | 0 | 0 | 0 | 0 |
| 12 | 100 | 0 | 0 | 30(C-2) | 0 | 0 | 0 | 0 |
| 13 | 100 | 0 | 0 | 30(C-3) | 0 | 0 | 0 | 0 |
| 14 | 100 | 0 | 0 | 0 | 0 | 0 | 19.3 | 0 |
| 15 | 100 | 5(e-1) | 0 | 0 | 0 | 35 | 0 | 0 |
| 16 | 100 | 0 | 0 | 0 | 33.3(D-1) | 0 | 0 | 0 |
| 17 | 100 | 0 | 0 | 0 | 0 | 0 | 0 | 25 |

TABLE 3

| Examples | 1 | 2 | 3 | 4 | 5 | 6 | 11 | 12 | 13 | 14 |
|---|---|---|---|---|---|---|---|---|---|---|
| Screw load | 10 | 9 | 11 | 13 | 10 | 10 | 18 | 8 | 16 | 20 |
| Extruded amount | 52 | 55 | 50 | 45 | 51 | 46 | 36 | 47 | 43 | 45 |
| Tensile strength | 8.5 | 8.1 | 8.8 | 8.4 | 8.3 | 8.6 | 6.9 | 6.5 | 7.7 | 5.5 |
| Tensile elastic modulus | 584 | 552 | 602 | 566 | 574 | 550 | 421 | 391 | 458 | 355 |
| Flexural strength | 11.6 | 10.6 | 12.1 | 11.9 | 11.2 | 10.8 | 9.1 | 8.8 | 9.6 | 7.8 |
| Flexural elastic modulus | 552 | 523 | 576 | 543 | 543 | 532 | 405 | 460 | 488 | 390 |
| Impact strength | 19.5 | 17.8 | 20.5 | 15.5 | 18.8 | 17.9 | 5.1 | 10.5 | 8.4 | 4.1 |
| Heat deformation temperature | 80.5 | 81.3 | 81.5 | 79.8 | 82.5 | 81.7 | 75.4 | 81.5 | 78.4 | 70.9 |
| Moisture resistance | 99.5 | 99.4 | 99.9 | 99.4 | 99.7 | 99.5 | 82.3 | 75.1 | 88.1 | 69.4 |
| Surface appearance | ○ | ○ | ○ | ○ | ○ | ○ | X | Δ | X | X |
| Glass fiber dispersibility | ○ | ○ | ○ | ○ | ○ | ○ | X | ○ | Δ | X |

TABLE 4

| Examples | 7 | 8 | 9 | 10 | 15 | 16 | 17 |
|---|---|---|---|---|---|---|---|
| Screw load | 8 | 7 | 8 | 9 | 7 | 18 | 20 |
| Extruded amount | 18.1 | 18.6 | 17.5 | 16.8 | 18.5 | 10.3 | 6.1 |
| Tensile strength | 11.3 | 11.1 | 11.0 | 10.5 | 10.5 | 9.5 | 9.1 |
| Tensile elastic modulus | 742 | 739 | 736 | 733 | 731 | 545 | 508 |
| Flexural strength | 18.1 | 18.0 | 17.4 | 17.3 | 17.6 | 12.4 | 13.2 |
| Flexural elastic modulus | 778 | 769 | 768 | 770 | 764 | 562 | 631 |
| Impact strength | 29.1 | 25.3 | 28.4 | 26.8 | 15.9 | 5.5 | 4.6 |

TABLE 4-continued

| Examples | 7 | 8 | 9 | 10 | 15 | 16 | 17 |
|---|---|---|---|---|---|---|---|
| Heat deformation temperature | 80.5 | 81.3 | 79.9 | 80.2 | 79.8 | 73.5 | 70.9 |
| Moisture resistance | 99.5 | 99.4 | 99.1 | 99.4 | 99.1 | 88.5 | 69.4 |
| Surface appearance | ○ | ○ | ○ | ○ | ○ | Δ | X |
| Glass fiber dispersibility | ○ | ○ | ○ | ○ | ○ | Δ | X |

We claim:

1. A composition comprising 100 parts by weight of a vinyl chloride polymer (A) and 10 to 200 parts by weight of coated glass fibers (1) coated with a coating resin obtained by melting a component comprising a polymer (a) miscible with the vinyl chloride polymer, a crystalline polymer (b) immiscible with the vinyl chloride polymer and a peroxide (c).

2. The composition according to claim 1, wherein the coating resin is a resin obtained by melting a component comprising the polymer (a), the polymer (b), the peroxide (c) and a monomer (d) to improve an adhesion to the glass fibers.

3. The composition according to claim 2, wherein the monomer (d) is a vinyl monomer having a functional group selected from the group consisting of an epoxy group, a carboxyl group and a carboxyl anhydride group.

4. The composition according to claim 1, wherein the polymer (a) is a copolymer of a vinyl cyanide monomer and an aromatic vinyl monomer, or a methacrylic acid alkyl ester polymer.

5. The composition according to claim 1, wherein the polymer (a) is an acrylonitrile-styrene copolymer or polymethyl methacrylate.

6. The composition according to claim 1, wherein the polymer (b) is an olefin polymer.

7. The composition according to claim 1, wherein the polymer (b) is polypropylene.

8. The composition according to claim 1, wherein the melt viscosity of the coating resin is at most 1,000 poise.

9. The composition according to claim 1, wherein the coated glass fibers (1) are obtained by continuously passing the glass fibers through the coating resin in a melt state.

10. The composition according to claim 1, wherein the amount of the coating resin is 5 to 60% by weight to the coated glass fibers (1), and is at most 100 parts by weight to 100 parts by weight of the vinyl chloride polymer.

11. A composition comprising 100 parts by weight of a vinyl chloride polymer (A) and 10 to 200 parts by weight of coated glass fibers (2) coated with a coating resin of a copolymer (e) having a polymer chain (X) immiscible with the vinyl chloride polymer (A) and a polymer chain (Y) miscible with the vinyl chloride polymer in the same molecule.

12. The composition according to claim 11, wherein the polymer chain (X) is a polymer chain wherein an olefin monomer is polymerized, and the polymer chain (Y) is a polymer chain wherein a vinyl cyanide monomer and an aromatic vinyl monomer are copolymerized, or a methacrylic acid alkyl ester monomer is polymerized.

13. The composition according to claim 11, wherein the copolymer (e) is a copolymer comprising 95 to 5% by weight of the polymer chain (X) and 5 to 95% by weight of the polymer chain (Y).

14. The composition according to claim 11, wherein the amount of the coating resin is 5 to 60% by weight to the coated glass fibers (1), and is at most 100 parts by weight to 100 parts by weight of the vinyl chloride polymer.

15. A composition comprising 100 parts by weight a vinyl chloride polymer (A), 1 to 15 parts by weight of a copolymer (e) having a polymer chain (X) immiscible with the vinyl chloride polymer and a polymer chain (Y) miscible with the vinyl chloride polymer in the same molecule, and 10 to 150 parts by weight of coated glass fibers (3) coated with a coating resin of a thermoplastic resin miscible with the vinyl chloride polymer.

16. The composition according to claim 15, wherein the thermoplastic resin is a copolymer of 99.5 to 50% by weight of a monomer to form a polymer miscible with the vinyl chloride polymer and 0.5 to 50% by weight of a vinyl monomer having a functional group selected from the group consisting of an epoxy group, a carboxyl group and a carboxylic anhydride group.

17. The composition according to claim 15, wherein the polymer chain (X) is a polymer chain wherein an olefin monomer is polymerized, and the polymer chain (Y) is a polymer chain wherein a vinyl cyanide monomer and an aromatic vinyl monomer are copolymerized, or a methacrylic acid alkyl ester monomer is polymerized.

18. The composition according to claim 15, wherein the polymer chain (X) is a polymer chain wherein propylene is polymerized.

19. The composition according to claim 15, wherein the amount of the coating thermoplastic resin is 5 to 60% by weight to the coated glass fibers (3), and is at most 100 parts by weight to 100 parts by weight of the vinyl chloride polymer.

* * * * *